(12) United States Patent
Oh et al.

(10) Patent No.: US 10,313,492 B2
(45) Date of Patent: Jun. 4, 2019

(54) LAYER ONE SIGNALING FOR PHYSICAL LAYER PIPES (PLPS)

(71) Applicant: SAMSUNG ELECTRONICS CO., LTD., Suwon-si (KR)

(72) Inventors: Young-ho Oh, Suwon-si (KR); Hak-ju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 15/167,140

(22) Filed: May 27, 2016

(65) Prior Publication Data

US 2016/0352873 A1 Dec. 1, 2016

Related U.S. Application Data

(60) Provisional application No. 62/167,988, filed on May 29, 2015.

(30) Foreign Application Priority Data

Mar. 28, 2016 (KR) ........................ 10-2016-0036945

(51) Int. Cl.
*H04L 29/06* (2006.01)
*H04L 29/08* (2006.01)
(Continued)

(52) U.S. Cl.
CPC .......... *H04L 69/22* (2013.01); *H04L 12/4633* (2013.01); *H04L 69/323* (2013.01);
(Continued)

(58) Field of Classification Search
None
See application file for complete search history.

(56) References Cited

U.S. PATENT DOCUMENTS 8,842,223 B2 * 9/2014 Takahashi .............. H04H 20/77
  348/133
9,602,321 B2 * 3/2017 Baek ................... H04L 27/2627
(Continued)

FOREIGN PATENT DOCUMENTS

EP  2645709 A2  10/2013

OTHER PUBLICATIONS

International Search Report, issued by International Searching Authority in corresponding International Application No. PCT/KR2016/005717, dated Aug. 31, 2016, (PCT/ISA/210).
(Continued)

*Primary Examiner* — Donald L Mills
(74) *Attorney, Agent, or Firm* — Sughrue Mion, PLLC

(57) ABSTRACT

A transmitting apparatus is provided. The transmitting apparatus includes at least one processor configured to implement: an L1 signaling generator configured to generate L1 signaling; a frame generator configured to generate a frame having a payload in which a plurality of Physical Layer Pipes (PLPs) are included; and a signal processor configured to transmit the frame by adding a preamble including the L1 signaling in the frame. The L1 signaling includes first information representing an alignment state of starting positions of PLPs included in different layers among the plurality of PLPs and second information representing at least one offset of the starting positions. Accordingly, the preamble includes the L1 signaling including information on an arrangement order of the plurality of PLPs included in the payload.

17 Claims, 25 Drawing Sheets

(51) Int. Cl.
  *H04L 12/46* (2006.01)
  *H04L 1/00* (2006.01)
(52) U.S. Cl.
  CPC .............. *H04L 1/00* (2013.01); *H04L 1/0079* (2013.01); *H04L 12/46* (2013.01)

(56) References Cited

U.S. PATENT DOCUMENTS

| | | | | |
|---|---|---|---|---|
| 2010/0085985 | A1* | 4/2010 | Pekonen | H04L 1/0071 370/474 |
| 2011/0026636 | A1* | 2/2011 | Ko | H04L 5/0053 375/295 |
| 2011/0131464 | A1* | 6/2011 | Ko | H04L 1/0041 714/752 |
| 2011/0299628 | A1* | 12/2011 | Ko | H04L 1/0044 375/298 |
| 2012/0188954 | A1* | 7/2012 | Mourad | H04N 21/236 370/329 |
| 2012/0288029 | A1* | 11/2012 | Ouchi | H04L 1/0057 375/296 |
| 2013/0219431 | A1* | 8/2013 | Hong | H04H 20/42 725/54 |
| 2014/0079004 | A1 | 3/2014 | Mourad et al. | |
| 2014/0105328 | A1 | 4/2014 | Ko et al. | |
| 2014/0185563 | A1 | 7/2014 | Kwon et al. | |
| 2016/0294509 | A1* | 10/2016 | Shin | H04L 27/2649 |
| 2017/0126457 | A1* | 5/2017 | Ko | H04L 27/2627 |
| 2017/0310518 | A1* | 10/2017 | Kim | H04L 1/0052 |
| 2017/0338991 | A1* | 11/2017 | Ko | H04L 1/0041 |

OTHER PUBLICATIONS

Written Opinion, issued by International Searching Authority in corresponding International Application No. PCT/KR2016/005717, dated Aug. 31, 2016, (PCT/ISA/237).

ETSI, "Digital Video Broadcasting (DVB); Modulator Interface (T2-MI) for a second generation digital terrestrial television broadcasting system (DVB-T2)", EBU-UER Digital Video Broadcasting, Technical Specification, ETSI TS 102 773 V1.3.1, Reference: RTS/JTC-DVB-312, Jan. 2012 (54 Pages Total).

Communication dated Jul. 19, 2018, from the Intellectual Property Office of Canada in counterpart application No. 2,984,481.

* cited by examiner

FIG. 9

| Injection level of EL below CL level(dB) | CL power ratio relative to total power(%) | EL power ratio relative to total power(%) | Reduction of CL power relative to total power (dB) | Reduction of EL power relative to total power(dB) |
|---|---|---|---|---|
| 0.0 dB | 50.0% | 50.0% | 3.01 | 3.01 |
| +0.5 dB | 52.9% | 47.1% | 2.77 | 3.27 |
| +1.0 dB | 55.7% | 44.3% | 2.54 | 3.54 |
| +1.5 dB | 58.5% | 41.5% | 2.32 | 3.82 |
| +2.0 dB | 61.3% | 38.7% | 2.12 | 4.12 |
| +2.5 dB | 64.0% | 36.0% | 1.94 | 4.44 |
| +3.0 dB | 66.6% | 33.4% | 1.76 | 4.76 |
| +3.5 dB | 69.1% | 30.9% | 1.60 | 5.10 |
| +4.0 dB | 71.5% | 28.5% | 1.46 | 5.46 |
| +4.5 dB | 73.8% | 26.2% | 1.32 | 5.82 |
| +5.0 dB | 76.0% | 24.0% | 1.19 | 6.19 |
| +6.0 dB | 79.9% | 20.1% | 0.97 | 6.97 |
| +7.0 dB | 83.4% | 16.6% | 0.79 | 7.79 |
| +8.0 dB | 86.3% | 13.7% | 0.64 | 8.64 |
| +9.0 dB | 88.8% | 11.2% | 0.51 | 9.51 |
| +10.0 dB | 90.9% | 9.1% | 0.41 | 10.41 |
| +11.0 dB | 92.6% | 7.4% | 0.33 | 11.33 |
| +12.0 dB | 94.1% | 5.9% | 0.27 | 12.27 |
| +13.0 dB | 95.2% | 4.8% | 0.21 | 13.21 |
| +14.0 dB | 96.2% | 3.8% | 0.17 | 14.17 |
| +15.0 dB | 96.9% | 3.1% | 0.14 | 15.14 |
| +16.0 dB | 97.5% | 2.5% | 0.11 | 16.11 |
| +17.0 dB | 98.0% | 2.0% | 0.09 | 17.09 |
| +18.0 dB | 98.4% | 1.6% | 0.07 | 18.07 |
| +19.0 dB | 98.8% | 1.2% | 0.05 | 19.05 |
| +20.0 dB | 99.0% | 1.0% | 0.04 | 20.04 |
| +21.0 dB | 99.2% | 0.8% | 0.03 | 21.03 |
| +22.0 dB | 99.4% | 0.6% | 0.03 | 22.03 |
| +23.0 dB | 99.5% | 0.5% | 0.02 | 23.02 |
| +24.0 dB | 99.6% | 0.4% | 0.02 | 24.02 |
| +25.0 dB | 99.7% | 0.3% | 0.01 | 25.01 |

FIG. 13

```
        NUM_PLP
        RESERVED_2
      ┌ for k=0... NUM_PLP {
      │         PLP_ID_MAIN ─── 211
      │         ...
      │         PLP_SIZE ─── 212
      │         PLP_TYPE
      │         STARTING_POSITION
210 ──┤         If PLP_TYPE = 1{
      │                 NUM_SUB_SLICES
      │                 SUB_SLICE_INTERVAL
      │         }
      │         NUM_LAYER
      └         RESERVED_3
      ┌         for m=0... NUM_LAYER-1{
      │                 PLP_ID_LAYER ─── 221
      │                 ...
      │                 FEC_TYPE
      │                 if FEC_TYPE  {0,1,2,3,4,5,} {
      │                         CODE_RATE
      │                         MODULATION
      │                 }
220 ──┤                 if m > 0 {
      │                         EL_INJECTION_LEVEL ─── 222
      │                         ALIGNMENT_FLAG        1bit
      │                         if [not aligned] {
      │                                 START_POS_OFFSET    25bit
      │                         }                           ─── 223
      │                 }
      │                 RESERVED_4
      └         }
        }
```

LAYER ONE SIGNALING FOR PHYSICAL LAYER PIPES (PLPS)

CROSS-REFERENCE TO THE RELATED APPLICATIONS

This application claims the benefit of priority under 35 U.S.C. § 119 from Korean Patent Application No. 10-2016-0036945, filed on Mar. 28, 2016, in the Korean Intellectual Property Office, and the benefit of U.S. Provisional Application No. 62/167,988, filed on May 29, 2015, in the United States Patent and Trademark Office, the disclosures of which are incorporated herein by reference in their entireties.

BACKGROUND

1. Field

The present general inventive concept generally relates to a transmitting apparatus, a receiving apparatus, and a method for controlling the same, and more particularly, to a transmitting apparatus which maps and transmits data onto at least one signal processing path, a receiving apparatus, and a method for controlling the same.

2. Description of the Related Art

In the information-oriented society of the 21st century, broadcasting communication services are entering an era of digitization, multi-channel, broadband, and high quality. In particular, as high-quality digital television (TV), portable multimedia players (PMP), and portable broadcasting apparatuses have been increasingly used in recent years, even in digital broadcasting services, a demand for supporting various receiving methods has been increased.

In an actual state in which the standard group has established various standards according to demands to provide various services to satisfy user's needs, it is required to find methods for providing better services having improved performance.

SUMMARY

The present disclosure has been provided to address the aforementioned and other problems and disadvantages occurring in the related art, and an aspect of the present disclosure provides a transmitting apparatus which generates L1 signaling including diverse information, a receiving apparatus, and a method for controlling the same.

According to an exemplary embodiment, there is provided a transmitting apparatus. The transmitting apparatus may include: an L1 signaling generator configured to generate L1 signaling; a frame generator configured to generate a frame having a payload in which a plurality of Physical Layer Pipes (PLPs) are included; and a signal processor configured to transmit the frame by adding a preamble including the L1 signaling in the frame. The L1 signaling may include first information representing an alignment state of starting positions of PLPs included in different layers among the plurality of PLPs and second information representing an offset of the starting positions.

According to an exemplary embodiment, there is provided a receiving apparatus. The receiving apparatus may include: a receiver configured to receive a preamble including L1 signaling and a frame including a payload; and a signal processor configured to signal-process the frame. The payload may include a plurality of Physical Layer Pipes (PLPs). The L1 signaling may include first information representing an alignment state of starting positions of PLPs included in different layers among the plurality of PLPs and second information representing an offset of the starting positions. In addition, the signal processor may signal-process a plurality of PLPs included in the payload based on the first information and the second information.

According to an embodiment, there is provided a method for controlling a transmitting apparatus. The method may include: generating L1 signaling; generating a frame having a payload in which a plurality of Physical Layer Pipes (PLPs) are included; and transmitting the frame by adding a preamble including the L1 signaling in the frame. In addition, the L1 signaling may include first information representing an alignment state of starting positions of PLPs included in different layers among the plurality of PLPs and second information representing an offset of the starting positions.

According to an embodiment of the present disclosure, there is provided a method for controlling a receiving apparatus. The method may include: receiving a preamble including L1 signaling and a frame including a payload; and signal-processing the frame. The payload may include a plurality of Physical Layer Pipes (PLPs). The L1 signaling may include first information representing an alignment state of starting positions of PLPs included in different layers among the plurality of PLPs and second information representing an offset of the starting positions. In addition, the signal-processing the frame may include signal-processing a plurality of PLPs included in the payload based on the first information and the second information.

According to the above-described various exemplary embodiments, a preamble includes L1 signaling including information on an arrangement order of a plurality of PLPs included in a payload.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIGS. 7 to 11 are diagrams provided to describe Layered Division Multiplexing (LDM);

FIG. 13 is a diagram on a program syntax of L1 signaling according to an exemplary embodiment;

DETAILED DESCRIPTION OF THE EXEMPLARY EMBODIMENTS

Hereinafter, various exemplary embodiments of the inventive concept will be described in detail with reference to the accompanying drawings. Further, in the following description, a detailed explanation of known related functions or configurations may be omitted to avoid unnecessarily obscuring the subject matter. In addition, terms to be described below may vary according to a user's and an operator's intentions, the convention, or the like as terms defined by considering functions. Therefore, the definition should be made according to the contents throughout this specification.

An apparatus and a method proposed in the exemplary embodiments can be, of course, applied to various communication systems including mobile broadcasting services including a digital multimedia broadcasting (DMB) service, digital video broadcasting handheld (DVB-H), an advanced television systems committee mobile/handheld (ATSC-M/H) service, an Internet protocol television (IPTV), and the like, communication systems including a moving picture experts group (MPEG) media transport (MMT) system, an evolved packet system (EPS), a long-terms evolution (LTE) mobile communication system, a long-term evolution-advanced (LTE-A) mobile communication system, a high speed downlink packet access (HDSPA) mobile communication system, a high speed uplink packet access (HSUPA) mobile communication system, a 3rd generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an Institute of Electrical and Electronics Engineers (IEEE) 802.16m communication system, a mobile Internet protocol (Mobile IP) system, and the like.

Figure 1:
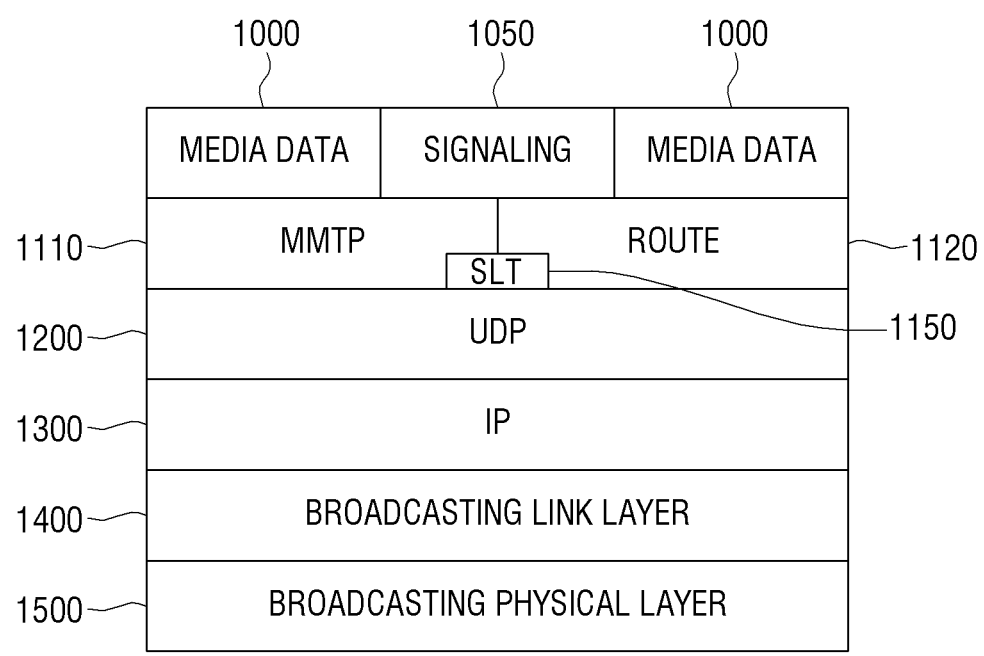
FIG. 1 is a diagram illustrating a hierarchical structure of a transmitting system according to an exemplary embodiment.

FIG. 1 is a diagram illustrating a hierarchical structure of a transmitting system according to an exemplary embodiment.

Referring to FIG. 1, a service includes media data 1000 and signaling 1050 for transferring information required to acquire and consume the media data at a receiver. The media data may be encapsulated in a format suitable for transmission prior to the transmission. An encapsulation method may follow a Media Processor (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application layer protocol, by which a service is transmitted, by an independent method different from the application layer protocol is required for the receiver to know by which application layer protocol the service is transmitted.

A service list table (SLT) 1150 illustrated in FIG. 1 represents or indicates a signaling method and packetizes information about the service in a table for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as 'ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-transport stream (TS) packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting-Second Generation Terrestrial (DVB-T2) standard, and one or more services or some of the services may be mapped to the PLP. Herein, the PLP indicates a signal path which is processed independently. In other words, services (for example, video, extended video, audio, data stream, etc.) may be transmitted and received through a plurality of RF channels, and the PLP refers to a path where these services are transmitted or received, or a stream which is transmitted through the path. The PLP may be located at slots which are distributed at time intervals on a plurality of RF channels, or may be distributed at time intervals on one RF channel. In other words, a single PLP may be distributed and transmitted with time intervals on one or a plurality of RF channels.

Figure 2:
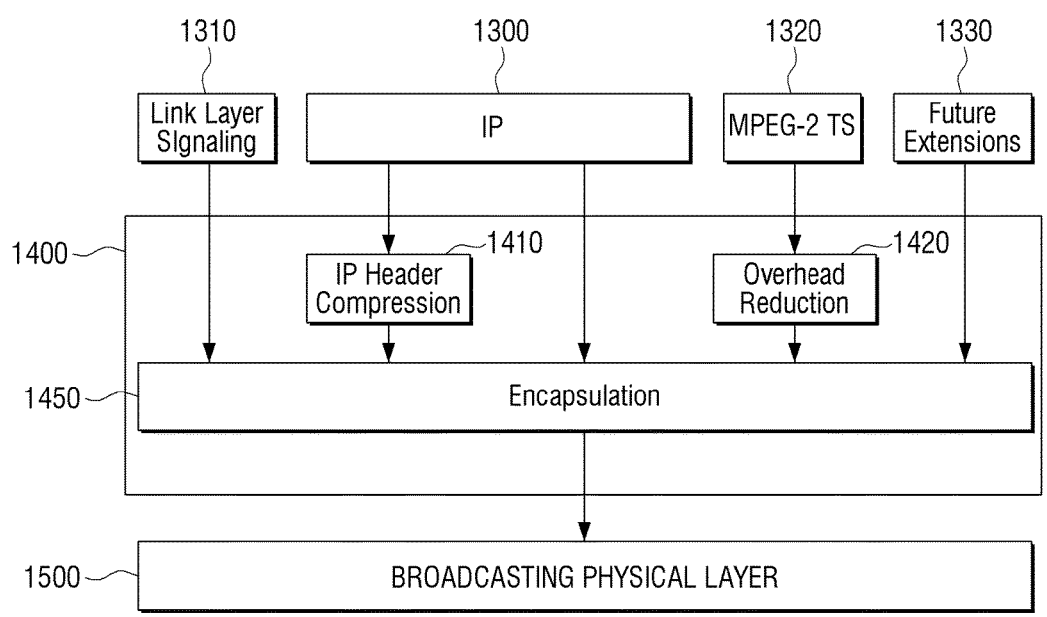
FIG. 2 is a diagram illustrating a schematic configuration of a broadcasting link layer 1400 according to an exemplary embodiment.

FIG. 2 is a diagram illustrating a schematic configuration of the broadcasting link layer 1400 according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
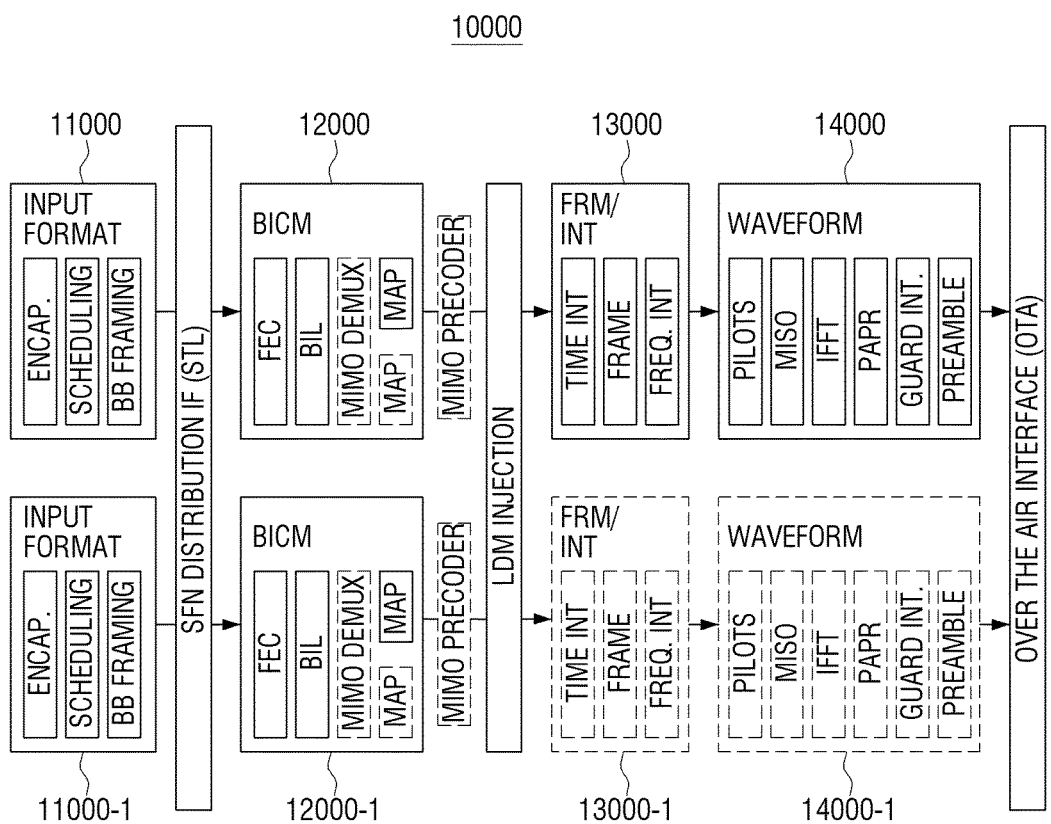
FIG. 3A is a diagram illustrating a schematic configuration of a transmitting system (or a transmitting apparatus) according to an exemplary embodiment.

FIG. 3A is a diagram illustrating a schematic configuration of a transmitting system (or a transmitting apparatus) according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ATSC 3.0 link-layer protocol (ALP) packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) through which the data to be serviced will be transmitted, and perform encoding and time interleaving. Meanwhile, signaling information about the data to be serviced may be encoded through a separate BICM encoder according to a system design or encoded by sharing a BICM encoder with the data to be serviced.

The framing/interleaving blocks 13000 and 13000-1 combine the time-interleaved data with a signaling signal including the signaling information to generate a transmission frame.

The waveform generation blocks 14000 and 14000-1 generate an orthogonal frequency-division multiplexing (OFDM) signal in a time domain from the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
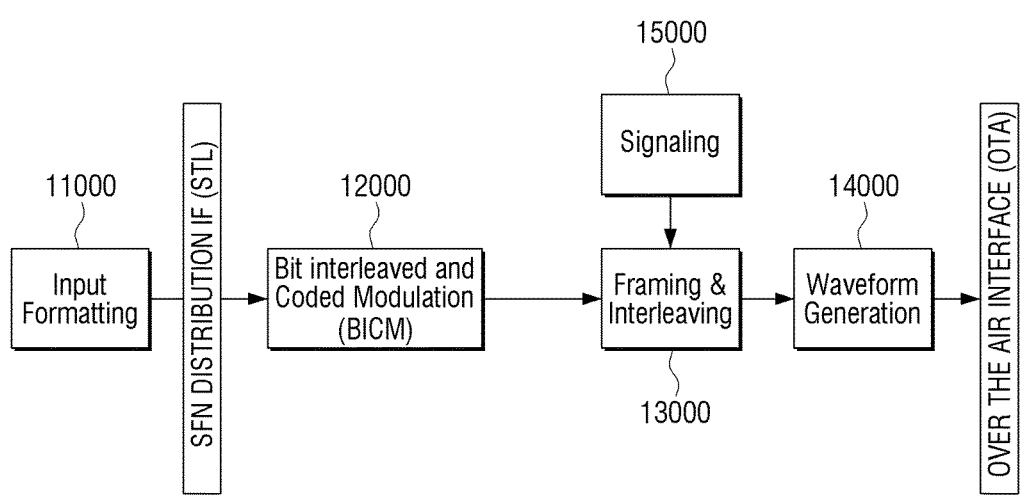
FIGS. 3B and 3C are diagrams illustrating a multiplexing method according to exemplary embodiments.
Figure 3C:
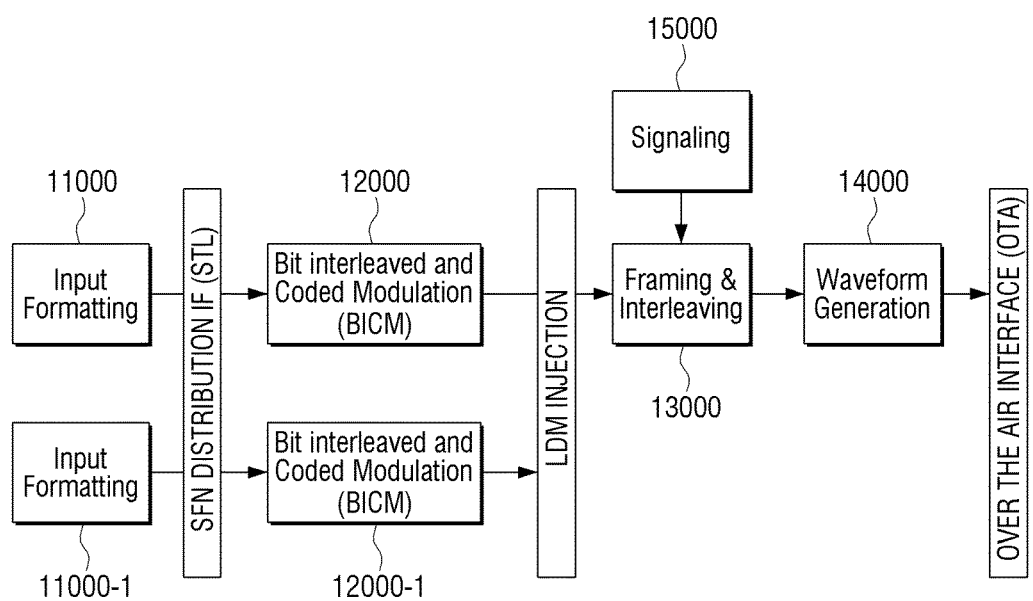

FIGS. 3B and 3C are diagrams illustrating a multiplexing method according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000.

Data is input and formatted in the input formatting block 11000 and forward error correction is applied to the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM) according to an exemplary embodiment.

An LDM system architecture includes several other blocks as compared with the TDM system architecture. In detail, two separated input formatting blocks 11000 and 11000-1 and the BICM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
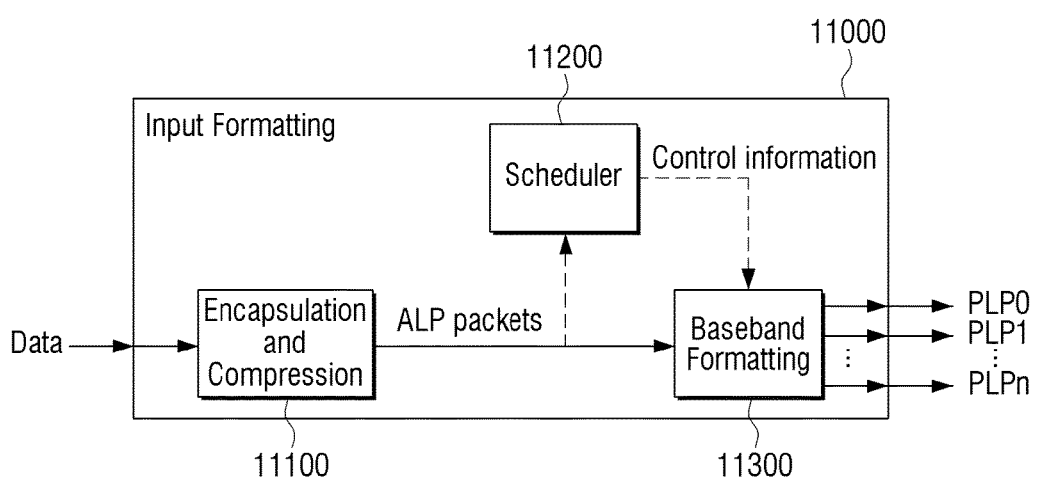
FIG. 4 is a block diagram illustrating a detailed configuration of an input formatting block illustrated in FIG. 3A, according to an exemplary embodiment.

FIG. 4 is a block diagram illustrating a detailed configuration of the input formatting block 11000 illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet is 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
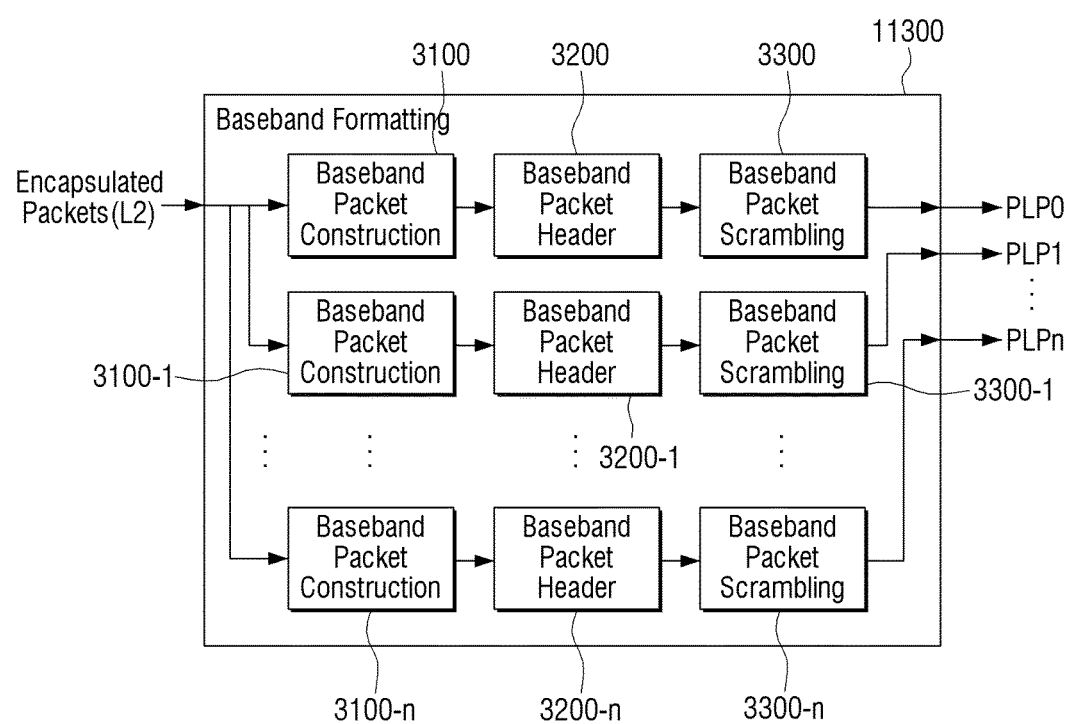
FIGS. 5A and 5B are diagrams to illustrate a detailed configuration of a baseband framing block, according to exemplary embodiments.

The baseband formatting block 11300 includes baseband packet construction blocks 3100, 3100-1, . . . 3100-n, baseband packet header construction blocks 3200, 3200-1, . . . , 3200-n, and baseband packet scrambling blocks 3300, 3300-1, . . . , 3300-n, as illustrated in FIG. 5A. In an M-PLP operation, the baseband formatting block generates a plurality of PLPs as necessary.

Figure 5B:
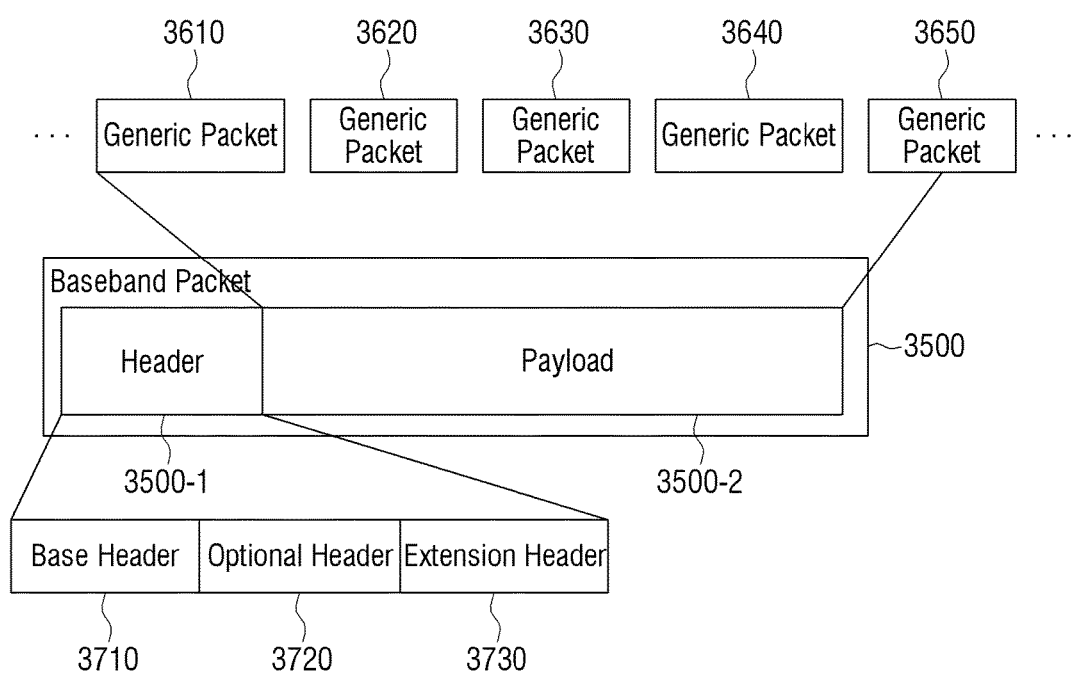

The baseband packet construction blocks 3100, 3100-1, . . . , 3100-n construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , 3200-n construct a header 3500-1. The header 3500-1 includes three parts, that is, a base field (also referred to as, a base header) 3710, an optional field (also referred to as, an option header) 3720, and an extension field (also referred to as, an extension header) 3730, as illustrated in FIG. 5B. Herein, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks 3300, 3300-1, . . . , 3000-n scramble the baseband packet.

Figure 6:
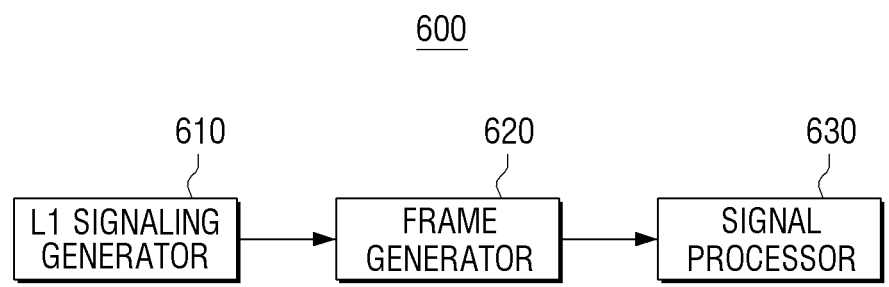
FIG. 6 is a block diagram illustrating a structure of a transmitting apparatus according to an exemplary embodiment.

FIG. 6 is a block diagram illustrating a structure of a transmitting apparatus according to an exemplary embodiment.

Referring to FIG. 6, a transmitting apparatus 600 includes an L1 signaling generator 610, a frame generator 620, and a signal processor 630.

The L1 signaling generator 610 generates L1 signaling. In this case, the L1 signaling generator 610 corresponds to a signaling unit 15000 of FIG. 3B. As described above, the L1 signaling may be encoded through a BICM encoder or encoded by sharing the BICM encoder with the date to be serviced, according to a system design. Specially, the L1 signaling includes information on a plurality of PLPs included in a payload constituting a frame or information on a data symbol.

The frame generator 620 generates a frame having a payload including a plurality of PLPs. To be specific, a frame include a boot strap, a preamble, and a payload. The boot strap includes information for processing an OFDM symbol included in a preamble, and the preamble includes information for processing an OFDM symbol included in the payload. The frame generator 620 corresponds to the framing/interleaving blocks 13000 of FIG. 3A.

The signal processor 630 processes the preamble including L1 signaling in the frame and transmits the frame. In this case, the signal processor 630 corresponds to the waveform generation blocks 14000 of FIG. 3A.

The L1 signaling included in the preamble includes first information representing an alignment state of starting positions of PLPs included in the different layers among the plurality of PLPs included in the payload and second information representing an offset of the starting positions. In order to explain the reason why the L1 singling includes the first information and the second information, the background, that is, Layered Division Multiplexing (LDM) will be described.

FIGS. 7 to 11 are views provided to describe Layered Division Multiplexing (LDM).

The LDM refers to a constellation superposition technology for combining a plurality of data streams according to a plurality of power levels with enabling different modulation and channel coding before transmission through one Radio Frequency (RF) channel.

Figure 7:
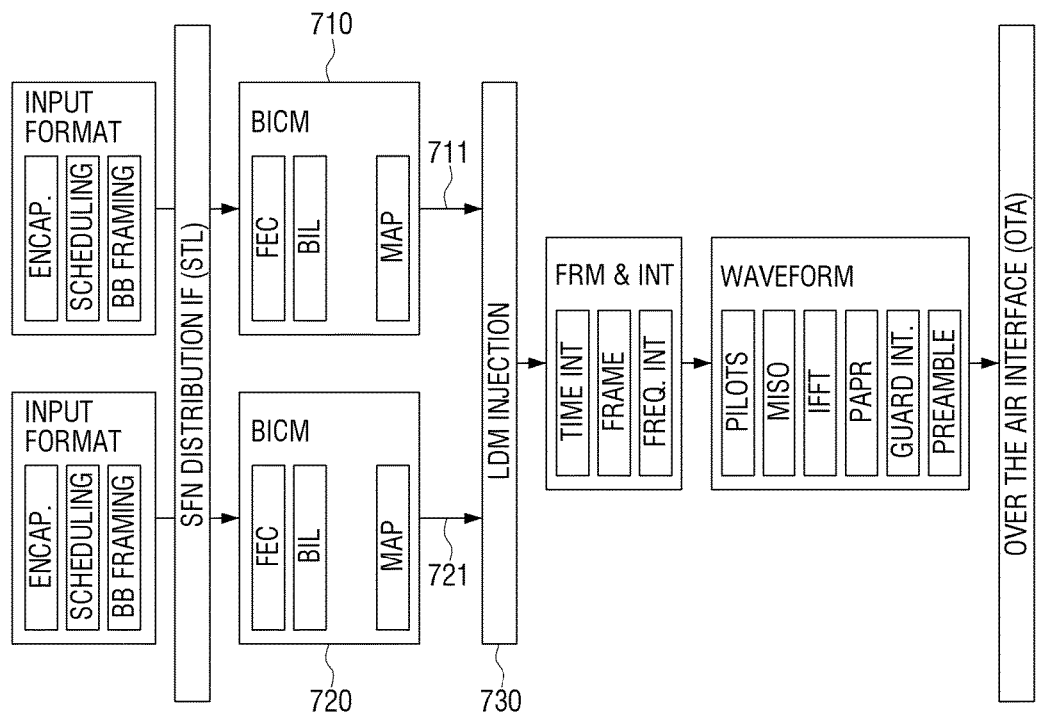

FIG. 7 is a block diagram of a LDM system for encoding two layers.

In this case, a two layer LDM combines two BICM chains 711, 721 output from BICM units 710, 720 before time interleaving the BICM chains. Each of the BICM chains 711, 721 is called as a PLP, and two layers are called as a core layer and an enhanced layer.

In this case, the core layer uses a Modulation and Coding Pair (ModCod) combination which is the same as or is more robust than the enhanced layer, and each layer uses different FEC encoding (including a code length and a code rate) and constellation mapping.

In general, the core layer and the enhanced layer use different code rates and constellations but use the same code length. For example, the core layer may use a code length of 64800, a code rate of 4/15, and constellation mapping of QPSK, and the enhanced layer may use a code length of 64800, a code rate of 10/15, and constellation mapping of 64 QAM.

The core layer and the enhanced layer are combined in an LDM injection block 730.

Figure 8:
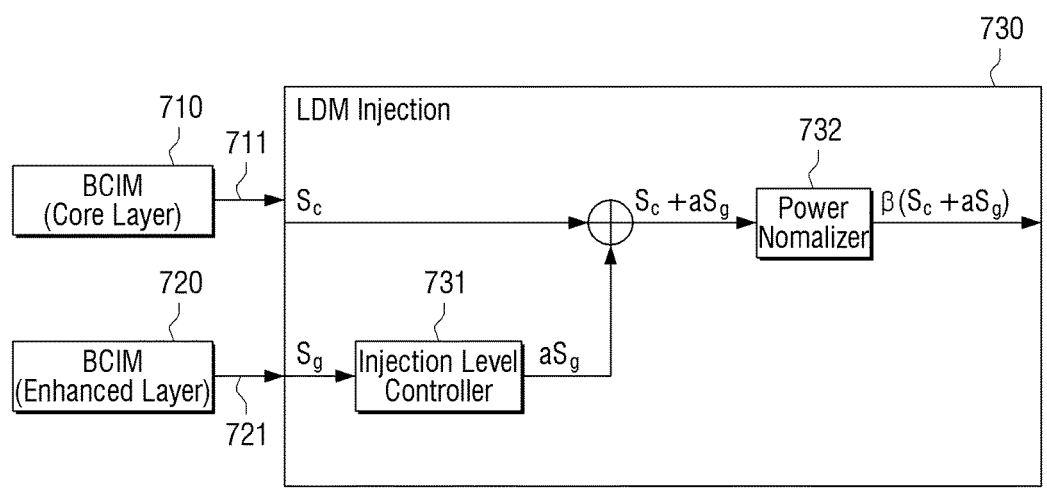

FIG. 8 illustrates a specific configuration of the LDM injection block 730 and constellation superposition for two-layer LDM.

To be specific, the LDM injection block 730 includes an injection level controller 731 and a power normalizer 732.

The injection level controller 731 is used to reduce power of the enhanced layer to be less than power of the core layer and may enable requested transmission energy to be output to each layer.

In this case, a transmission energy level is combined and selected with a ModCod parameter to achieve a required bit rate and coverage.

In connection with the core layer, an enhanced layer injection level may be selected in a unit of 0.5 dB or 1.0 dB in a section between 0.0 dB and 25.0 dB.

Specially, in connection with the core layer, the enhanced layer injection level is a transmission parameter for distributing transmission power between two layers.

Transmission robustness of each layer may vary by changing the injection level, and additional method other than the method for selecting ModCod parameter may be provided. In addition, a power distribution amount determined for each layer according to a variable injection level may be shown as in a table of FIG. 9.

In the table of FIG. 9, 'CL' denotes the core layer, and 'EL' denotes the enhanced layer. Referring to FIG. 9, in response to an injection level related to the CL being 3.0 dB, a CL power ratio is 66.6%, and an EL power ratio is 33.4%, with respect to the entire power. Accordingly, the reduced CL power is 1.76 dB, and the reduced EL power is 4.76 dB, with respect to the entire power.

In addition, in response to the injection level being increased in a unit of 0.5 dB or 1.0 dB in the section between 0.0 dB and 25.0 dB, the ratio of the CL power is gradually increased, and the ratio of the EL power is gradually decreased, with respect to the ratio of the entire power.

Figure 10:
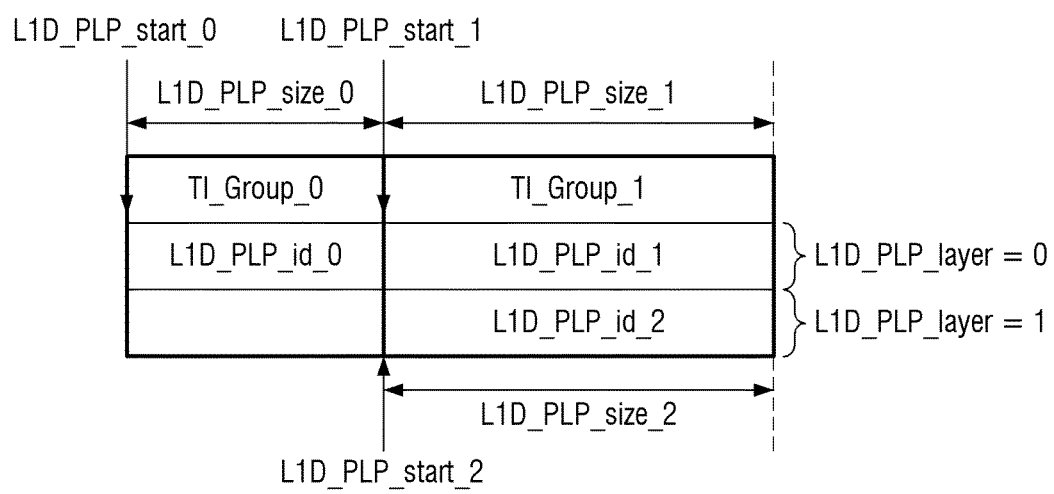

FIG. 10 illustrates two core layer PLPs (L1D_PLP_id_0, L1D_PLP_id_1) and one enhanced layer PLP (L1D_PLP_id_2). In this case, the enhanced layer PLP (L1D_PLP_id_2) has the same starting position and size or length as the corresponding core layer PLP (L1D_PLP_id_1). Accordingly, the enhanced layer PLP (L1D_PLP_id_2) and the core layer PLP (L1D_PLP_id_1) are aligned accurately.

In addition, two time interleaving groups (TI_Group_0, TI_Group_1) for each of the core layer PLPs are present.

Accordingly, the core layer PLP (L1D_PLP_id_0) is processed in the time interlacing group (TI_Group_0), and the core layer PLP (L1D_PLP_id_1) and the enhanced layer PLP (L1D_PLP_id_2) are processed in the time interleaving group (TI_Group_1).

Figure 11:
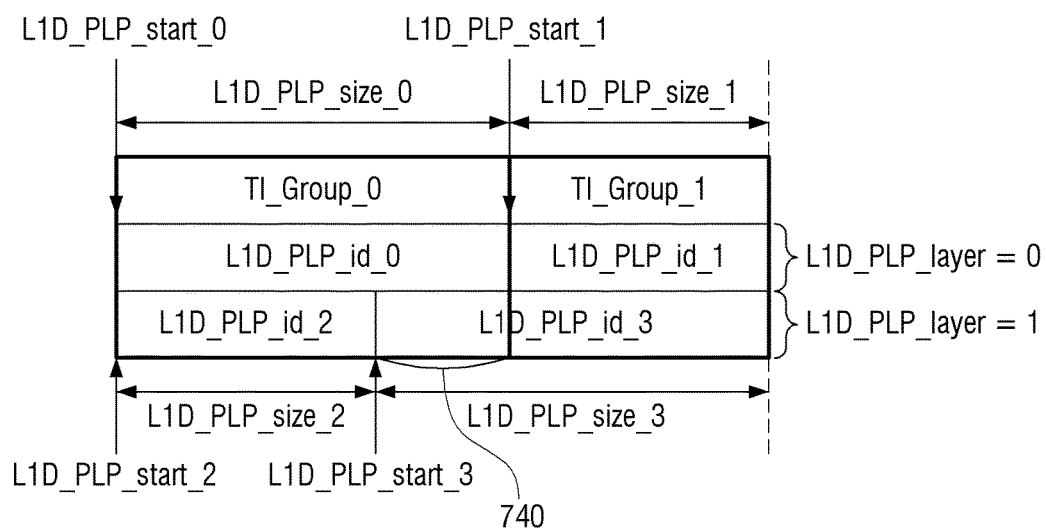

FIG. 11 illustrates the core layer PLPs and misaligned enhanced layer PLPs. In addition, two time interleaving groups (TI_Group_0, TI_Group_1) for each of the core layer PLPs are present.

In this case, L1D_PLP_start_0 and L1D_PLP_start_2 are the same as each other, and thus, L1D_PLP_id_2 is an enhanced layer PLP which is relevant to the TO_Group_0. L1D_PLP_size_2 is smaller than L1D_PLP_size_0, and thus, L1D_PLP_id_2 entirely belongs to TI_Group_0. In addition, L1D_PLP_id_2 is LDM-processed as the first L1D_PLP_size_2 data of TI_Group_0.

L1D_PLP_id_3 is an enhanced layer PLP which is relevant to both of TI_Group_0 and TI_Group_1. In this case, L1D_PLP_start_3 corresponds to a data cell index related to TI_Group_0 according to a cell multiplexing parameter regarding L1D_PLP_id_0.

L1D_PLP_id_3 has a size or length which is too great to entirely belong to TI_Group_0, and thus, L1D_PLP_id_3 belongs to a next time interleaving group (TI_Group_1) in a consecutive manner automatically.

In addition, a data cell 740 corresponding to a size of L1D_PLP_size_0-L1D_PLP_size_2 among data cells of L1D_PLP_id_3 is LDM-processed so as to belong to a size of L1D_PLP_size_0-L1D_PLP_size_2 of TI_Group_0, and a data cell corresponding to a size of L1D_PLP_size_3-(L1D_PLP_size_0-L1D_PLP_size_2) is LDM-processed so as to belong to TI_Group_1.

That is, the data cell 740 corresponding to the size of L1D_PLP_size_0-L1D_PLP_size_2 in L1D_PLP_id_3 is processed in TI_Group_0, and the other data cells than the data cell 740 corresponding to the size of L1D_PLP_size_0-L1D_PLP_size_2 in L1D_PLP_id_3 are processed in TI_Group_1.

In this case, the conventional L1 signaling generator divides L1D_PLP_id_3 into a plurality of segments and generates L1 signaling including information on a segment corresponding to the data cell 740 corresponding to the size of L1D_PLP_size_0-L1D_PLP_size_2 in L1D_PLP_id_3. However, the L1 signaling generator 610 of the present exemplary embodiment may generate L1 signaling including the first information representing the alignment state of the starting positions of the PLPs included in the different layers among the plurality of PLPs and the second information representing the offset of the starting positions.

In this case, the L1 signaling may further include information on an arrangement order of the PLPs included in the different layers and information on the layers in which the PLPs are included. To be specific, the information on the arrangement order of the PLPs included in the different layers represents an order or position of the PLPs arranged in each layer, and the information on the layers in which the PLPS are included refers to information as to whether a certain PLP is a PLP included in a core layer or a PLP included in an enhanced layer. In addition, in response to a plurality of enhanced layers being present, the information on the layers in which the PLPs are included may include information on an enhanced layer in which a certain PLP is included.

The different layers include one core layer and at least one enhanced layer, respectively. In addition, the different layers may generate the first information and the second information in a time leaving unit determined so as to correspond to a size of each of the plurality of PLPs included in the core layer.

That is, the time interleaving unit is determined based on the size of each of the plurality of PLPs included in the core layer. A detailed description will be provided below with reference to FIG. 12.

Figure 12:
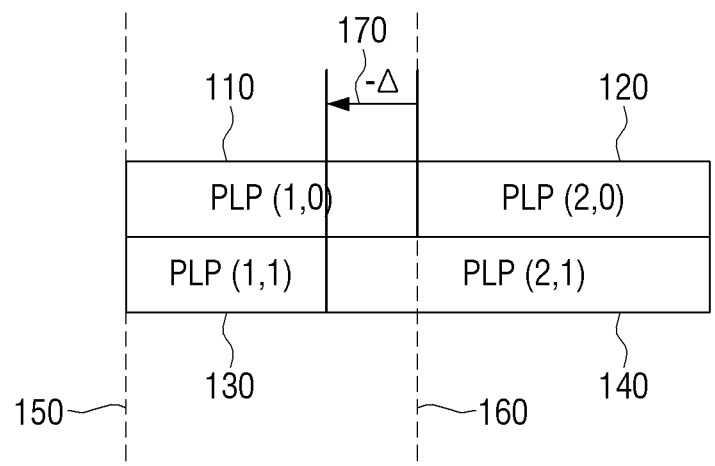
FIG. 12 is a diagram provided to describe information included in L1 signaling according to an exemplary embodiment.

FIG. 12 is a diagram provided to describe information included in L1 signaling according to an exemplary embodiment.

Referring to FIG. 12, a PLP(1,0) 110 and a PLP(2,0) 120 are PLPs which belong to the core layer, and a PLP(1,1) 130 and a PLP(2,1) 140 are PLPs which belong to the enhanced layer.

In this case, the time interleaving unit is determined based on a size of the PLP(1,0) 110 and the PLP(2,0) 120 which belong to the core layer. Hereinafter, the time interleaving unit corresponding to the size of the PLP(1,0) 110 is defined as a first time interleaving unit, and the time interleaving unit corresponding to the size of the PLP(2,0) 120 is defined as a second time interleaving unit.

Meanwhile, x of PLP(x,y) represents an order or position of the PLPs included in each layer, and x may be included in the L1 signaling as the information on the arrangement order of the PLPs included in the different layers.

In addition, y of PLP(x,y) shows which layer includes a certain layer, and y may be included in the L1 signaling as the information on the layers in which the PLPs are included.

For example, x is 2 in the PLP(2,1) 140, which represents that the PLP(2,1) 140 is arranged in the second sequential position in a layer in which the PLP(2,1) 140 is included. In addition, y is 1, which represents that the layer in which the PLP(2,1) 140 is included is an enhanced layer.

The L1 signaling generator 610 may generate the first information based on the starting positions of the PLPs having the same arrangement order in the respective different layers. In addition, in response to the starting positions being different, the L1 signaling generator 610 may generate the second information based on a difference in the starting positions of the PLPs having the same arrangement order in respective layers. In this case, the PLPs having the same arrangement order are PLPs where x of PLP(x,y) is the same.

For example, the L1 signaling generator 610 may generate the first information representing the alignment state of the starting positions and the second information representing the offset of the starting positions based on the starting positions of the PLP(1,0) 110 included in the core layer and the PLP(1,1) 130 included in the enhanced layer, which have the same arrangement orders in the first time interleaving unit.

To be specific, the stating positions of the PLP(1,0) 110 and the PLP(1,1) 130 are the same, and thus, it may be seen that the PLP(1,0) 110 and the PLP(1,1) 130 are in an aligned state 150. Accordingly, an offset of the starting positions is unnecessary.

Accordingly, the L1 signaling generator 610 may generate the first information representing that the stating positions of the PLP(1,0) 110 and the PLP(1,1) 130 are aligned in the time interleaving unit.

The L1 signaling generator 610 may generate the first information representing the alignment state of the starting positions based on the starting positions of the PLP(2,0) 120 included in the core layer and the PLP(2,1) 140 included in the enhanced layer, which have the same arrangement order in a second time interleaving unit. In addition, the L1 signaling generator 610 may generate the second information representing the offset of the starting positions based on a difference 170 in the starting positions of the PLP(2,0) 120 included in the core layer and the PLP(2,1) 140 included in the enhanced layer, which have the same arrangement order in the second time interleaving unit.

To be specific, the starting positions of the PLP(2,0) 120 and the PLP(2,1) 140 are not the same, and thus, it may be seen that the PLP(2,0) 120 and the PLP(2,1) 140 are in a misaligned state 160. Accordingly, an offset of the starting positions may be determined as a distance 170 between the starting position of the PLP(2,0) 120 and the starting position of the PLP(2,1) 140. In this case, in response to the starting positions of the PLPs included in the different layers being different, the offset of the starting positions may be defined as a distance of the starting positions of the respective PLPs.

The second information may include information on a direction which is set with reference to a starting position of a PLP included in the core layer among the PLPs having the same arrangement order in the respective layers.

For example, the information on the direction may be distinguished by a mark '−' or '+'.

To be specific, in response to the direction being a left direction with reference to the starting position of the PLP(2,0) 120 included in the core layer, the distance 170 between the starting position of the PLP(2,0) 120 and the starting position of the PLP(2,1) 140 may be set to be '−', and in response to the direction being a right direction with reference to the starting position of the PLP(2,0) 120 included in the core layer, the distance 170 between the starting position of the PLP(2,0) 120 and the starting position of the PLP(2,1) 140 may be set to be '+'. However, this is only an example, and a reference and mark for setting a direction may vary depending upon system setting.

Consequently, the L1 signaling generator 610 generates the L1 signaling including information representing that the PLP(1,0) 110 and the PLP(1,1) 130 are aligned, the PLP(2,0) 120 and the PLP(2,1) 140 are misaligned, and the offset of the starting positions is '−a' in the time interleaving unit. In response to the signal processor 630 including a preamble including the L1 signaling in the frame and transmitting the frame to a receiving apparatus (not shown), the receiving apparatus (not shown) determines whether the respective PLPs are aligned in each layer based on the information on the alignment state of the PLPs and information on the offset of the starting positions, included in the received L1 signaling. In response to determining that the PLPs are misaligned, the receiving apparatus (not shown) may determine a degree of a difference in the misalignment. Accordingly, the receiving apparatus (not shown) may determine an arrangement position and size of the PLPs in each layer.

That is, based on the information representing that PLP (1,0) 110 included in the core layer and the PLP(1,1) 130 included in the enhanced layer are aligned, the PLP(2,0) 120 included in the core layer and the PLP(2,1) 140 included in the enhanced layer are misaligned, and the offset of the starting positions is '−a,' the receiving apparatus (not shown) may determine that the size of the PLP(1,1) 130 included in the enhanced layer is smaller than the size of the PLP(1,0) 110 included in the core layer by an amount of 'a,' and the size of the PLP(2,1) 140 included in the enhanced layer is bigger than the size of the PLP(2,0) 120 included in the core layer by an amount of 'a.' The receiving apparatus (not shown) may determine the arrangement position and size of the PLPs in the respective layers through the process.

FIG. 13 is a diagram on a program syntax of L1 signaling according to an exemplary embodiment.

Referring to FIG. 13, a first paragraph 210 in the program syntax of the L1 signaling represents information on the core layer, and a second paragraph 220 represents information on the enhanced layer.

Specially, PLP_ID_MAIN 211 in the first paragraph 210 regarding the core layer represents information on the arrangement order of the PLPs included in the core layer. That is, PLP_ID_MAIN 211 includes information on x of PLP(x,y). Accordingly, it may be seen that PLP_ID_MAIN 211 represents the arrangement order of the PLPs included in the enhanced layer, as well as the arrangement order of the PLPs included in the core layer, since the PLPs included in the enhanced layer include PLP(x,y).

In addition, PLP_SIZE 212 in the first paragraph 210 regarding the core layer represents a size of the PLPs included in the core layer. Accordingly, the time interleaving unit may be determined based on PLP_SIZE 212. In response to the determining the size of the PLPs included in the core layer through PLP_SIZE 212, the size of the entire PLPs included in the enhanced layer may be also determined based on the alignment state of the starting positions and the offset of the starting positions of the PLPs included in the core layer and the enhanced layer. Accordingly, as described above, the receiving apparatus (not shown) may determine the arrangement position and size of the PLPs in the respective layers.

Meanwhile, PLP_ID_LAYER 221 in the second paragraph 220 regarding the enhanced layer represents information on the layers in which the PLPs are included. That is, PLP_ID_LAYER 221 includes information on y of the PLP(x,y). For example, when PLP_ID_LAYER 221 is 0, it represents that the PLP belongs to the core layer, and when PLP_ID_LAYER 221 is 1, it represents that the PLP belongs to the enhanced layer.

Accordingly, the receiving apparatus (not shown) may detect a layer in which a certain PLP is included and an arrangement order of the PLP in the layer accurately by combining PLP_ID_MAIN 211 and PLP_ID_LAYER 221.

In addition, ALIGNMENT_FLAG 222 in the second paragraph 220 regarding the enhanced layer represents the alignment state of the starting positions of the PLPs included in the different layers. The above-described first information corresponds to ALIGNMENT_FLAG 222, and ALIGNMENT_FLAG 222 may be realized as 1 bit.

For example, when ALIGNMENT_FLAG 222 is 1, it represents that the starting positions of the PLPs included in the different layers are aligned, and when ALIGNMENT_

FLAG 222 is 1, it represents that the starting positions of the PLPs included in the different layers are misaligned.

In addition, START_POS_OFFSET 223 in the second paragraph 220 regarding the enhanced layer represents the offset of the starting positions. The above-described second information corresponds to START_POS_OFFSET 223, and START_POS_OFFSET 223 may be realized as 25 bits.

Meanwhile, 1 bit for representing a direction set with reference to the starting positions of the PLPs included in the core layer may be added to START_POS_OFFSET 223.

In this case, START_POS_OFFSET 223 is not activated in response to a value which is set for ALIGNMENT_FLAG 222 representing that the starting positions of the PLPs included in the different layers are aligned. That is, START_POS_OFFSET 223 may be activated only when the value which is set for ALIGNMENT_FLAG 222 representing that the starting positions of the PLPs included in the different layers are misaligned.

For example, in response to ALIGNMENT_FLAG 222 being set to be 0 so as to represent that the starting positions of the PLPs included in the different layers are aligned, START_POS_OFFSET 223 becomes not available, and in response to ALIGNMENT_FLAG 222 being set to be 1 so as to represent that the starting positions of the PLPs included in the different layers are misaligned, START_POS_OFFSET 223 may be activated and set as a value representing 'a.'

Figure 14A:
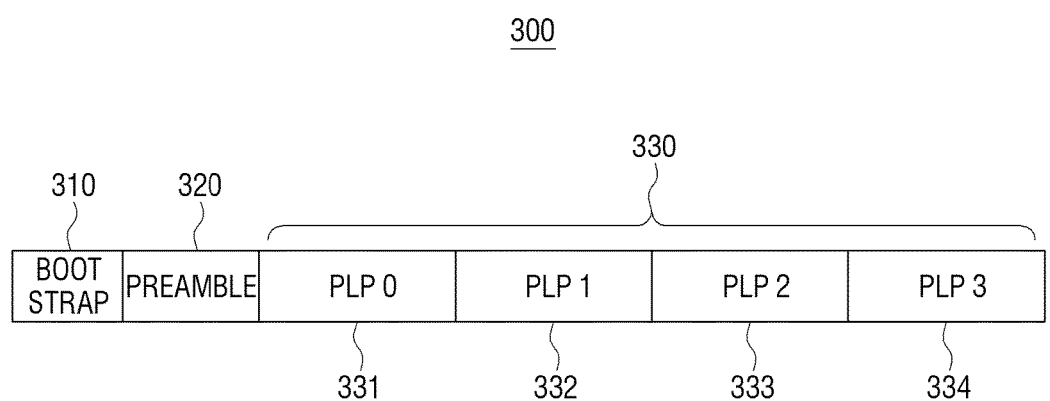
FIGS. 14A and 14B are diagrams provided to describe information included in L1 signaling according to another exemplary embodiment.
Figure 14B:
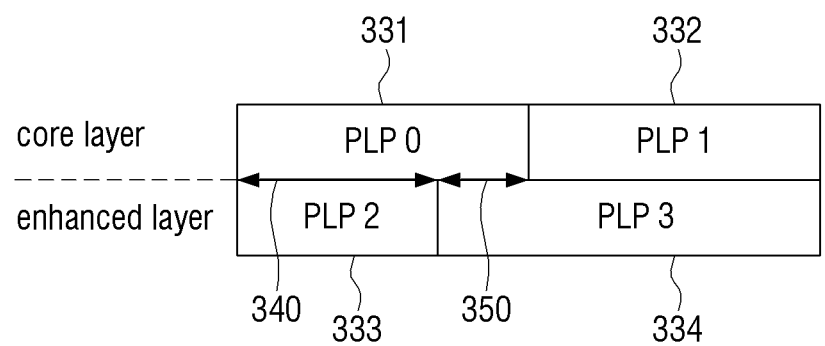

FIGS. 14A and 14B are diagrams provided to describe information included in L1 signaling according to another exemplary embodiment.

In response to the plurality of PLPs included in the payload being arranged in a transmission order and included in the payload, the L1 signaling may further include information on a size of each of the plurality of PLPs included in the payload, information on a layer in which each of the plurality of PLPs is included, and information on a PLP having the greatest corresponding degree with respect to a PLP of the core layer among the PLPs in the enhanced layer which correspond to one PLP of the core layer.

Referring to FIG. 14A, a frame 300 includes a boot strap 310, a preamble 320, and a payload 330. In this case, the payload 330 includes a plurality of PLPs (PLP 0 (331), PLP 1 (332), PLP 2 (333), PLP 3 (334)).

Specially, the PLP 0 (331), PLP 1 (332), PLP 2 (333), and PLP 3 (334) are transmitted sequentially, from the PLP 0 (331) to the PLP 3 (334). Accordingly, the PLP 0 (331), PLP 1 (332), PLP 2 (333), and PLP 3 (334) are arranged in the payload 330 in the transmission order.

Referring to FIG. 14B, the L1 signaling may further include information on a size of each of the PLP 0 (331), PLP 1 (332), PLP 2 (333), and PLP 3 (334) included in the payload 330, information on a layer in which each of the PLP 0 (331), PLP 1 (332), PLP 2 (333), and PLP 3 (334) is included, and information on the PLP 2 (333) having the greatest corresponding degree in the PLP 2 (333) and the PLP 3 (334) corresponding the PLP 0 (331).

In this case, the receiving apparatus (not shown) may determine the size of each of the PLP 0 (331), PLP 1 (332), PLP 2 (333), and PLP 3 (334) and the layer in which each of the PLP 0 (331), PLP 1 (332), PLP 2 (333), and PLP 3 (334) is included. In response to recognizing that a PLP in the enhanced layer having the greatest corresponding degree with respect to the PLP 0 (331) in the core layer is the PLP 2 (333), and a PLP in the enhanced layer having the greatest corresponding degree with respect to the PLP 1 (332) in the core layer is the PLP 3 (334), the receiving apparatus (not shown) may determine the arrangement position of the PLPs in each layer.

Figure 15:
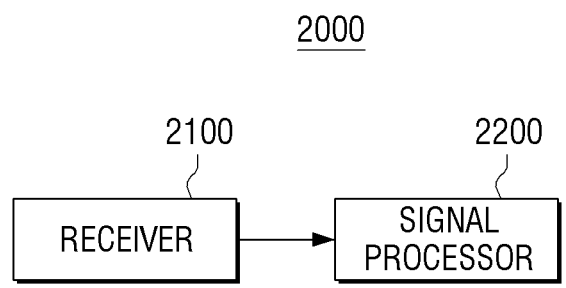
FIG. 15 is a block diagram illustrating a structure of a receiving apparatus according to an exemplary embodiment.

FIG. 15 is a block diagram illustrating a structure of a receiving apparatus according to an exemplary embodiment.

Referring to FIG. 15, a receiving apparatus 2000 includes a receiver 2100 and a signal processor 2200.

The receiver 2100 receives a preamble including L1 signaling and a frame including a payload.

The signal processor 2200 signal-processes the received frame.

The payload includes a plurality of PLPs. In this case, the L1 signaling includes the first information representing the alignment state of the starting positions of the PLPs included in the different layers among the plurality of PLPs and the second information resenting the offset of the starting positions.

The signal processor 2200 may signal-process the plurality of PLPs included in the payload based on the first information and the second information.

In this case, the L1 signaling may further include information on the arrangement order of the PLPs included in the different layers and the information on the layers in which the PLPs are included.

The different layers may include one core layer and at least one enhanced layer, respectively. The signal processor 2200 may signal-process the plurality of PLPs in a time deinterleaving unit determined so as to correspond to the size of each of the plurality of PLPs included in the core layer.

Figure 16:
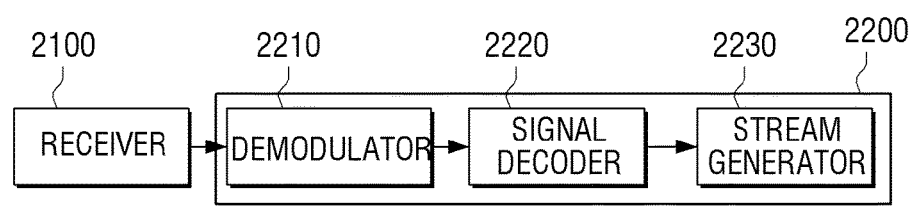
FIG. 16 is a block diagram provided to explain in detail a signal processor according to an exemplary embodiment.

FIG. 16 is a block diagram provided to explain in detail a signal processor according to an exemplary embodiment.

Referring to FIG. 16, the signal processor 2200 includes a demodulator 2210, a decoder 2220 and a stream generator 2230.

The demodulator 2210 performs demodulation according to OFDM parameters from the received RF signals, performs sync-detection, and recognizes whether a currently received frame includes necessary service data when the sync is detected from signaling information stored in a sync area. For example, the demodulator 831 may recognize whether a mobile frame is received or a fixed frame is received.

In this case, if OFDM parameters are not previously determined regarding a signaling area and a data area, the demodulator 831 may perform demodulation by obtaining OFDM parameters regarding the signaling area and the data area stored in the sync area, and obtaining information about OFDM parameters regarding the signaling area and the data area which are disposed right after the sync area.

The decoder 2220 performs decoding of necessary data. In this case, the decoder 2220 may perform decoding by obtaining parameters of an FEC method and a modulating method regarding the data stored in each data area based on the signaling information. Further, the decoder 2220 may calculate positions of necessary data based on the data information included in a configurable field and a dynamic field. Thus, it may calculate which positions of the frame a requested PLP is transmitted.

The stream generator 2230 may generate data to be served by processing a baseband packet input from the decoder 2220.

For example, the stream generator 2230 may generate an ALP packet from the baseband packet in which errors are corrected based on an ISSY mode, buffer size (BUFS), time to output (TTO) values and input stream clock reference (ISCR) values.

Specifically, the stream generator 2230 may include de-jitter buffers. The de-jitter buffers may regenerate correct timing to restore an output stream based on the ISSY mode, BUFS, TTO values and ISCR values. Thereby, a delay for sync between a plurality of PLPs can be compensated.

Figure 17:
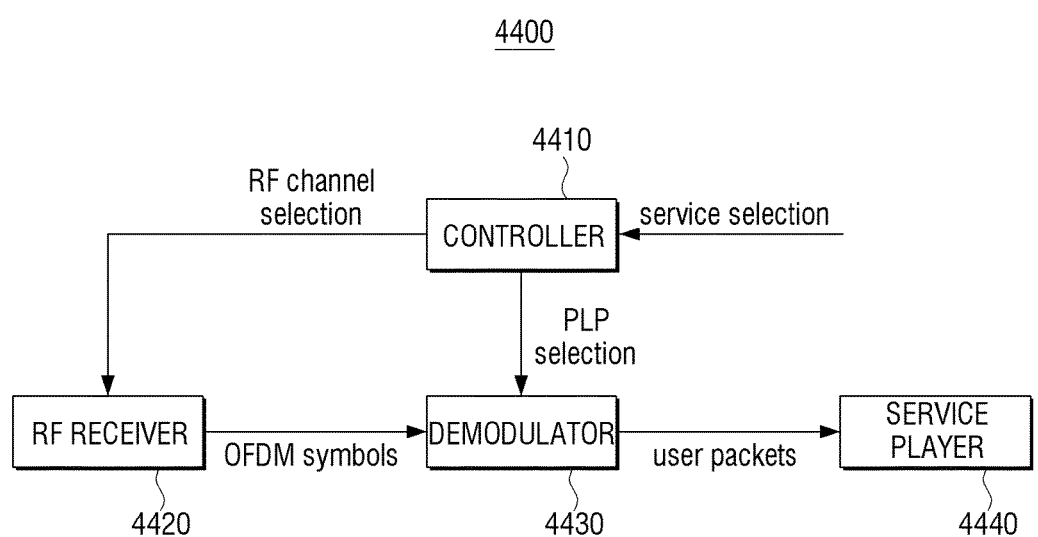
FIG. 17 is a block diagram of a receiving apparatus according to an exemplary embodiment.

FIG. 17 is a block diagram of a receiving apparatus according to an exemplary embodiment.

Referring to FIG. 17, the receiving apparatus 4400 may include a controller 4410, an RF receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing of the RF signals, to the demodulator 4430. The signal processing may include synchronization, channel estimation and equalization. Information required for the signal processing is predetermined between a transmitting apparatus and the receiving apparatuses or transmitted to the receiving apparatus in a predetermined OFDM symbols among the OFDM symbols.

The demodulator 4430 extracts a user packet by performing signal processing of the OFDM symbols, and delivers to the service player 4440. The service player 4440 plays and outputs the service selected by a user with the user packet. A format of the user packet may be different according to implementing services. For example, a TS packet or an IPv4 packet may be the user packet.

Figure 18:
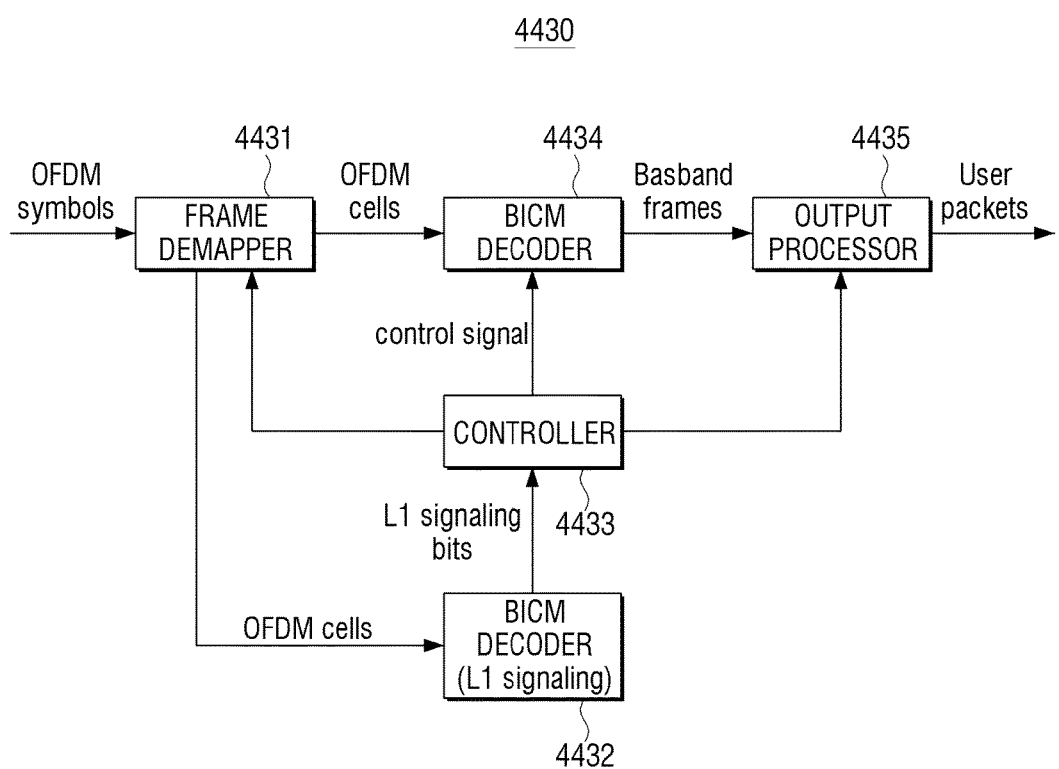
FIG. 18 is a block diagram describing the demodulator of FIG. 17 according to an exemplary embodiment.

FIG. 18 is a block diagram describing the demodulator of FIG. 17 according to an exemplary embodiment.

Referring to FIG. 18, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted with OFDM symbols based on controlling information delivered from the controller 4433, and delivers to the decoder 4434. Further, the frame demapper 4431 selects OFDM cells corresponding to more than one FEC block included in the L1 signaling, and delivers to BICM decoder 4432 for the L1 signaling.

The BICM decoder 4432 for the L1 signaling signal-processes the OFDM cells corresponding to the FEC blocks belonging to the L1 signaling, extracts L1 signaling bits, and delivers to the controller 4433. In this case, the signal processing may include extracting log-likelihood ratio (LLR) values for decoding low density parity check (LDPC) codes in OFDM cells, and decoding the LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 37 illustrates that the BICM decoder 4432 for the L1 signaling does not use controlling information of the controller 4433 for convenient explanation. However, if the L1 signaling includes a layer structure similar to the L1 pre-signaling and the L1 post-signaling described above, the BICM decoder 4432 for the L1 signaling may be constituted with more than one BICM decoding block, and operations of the BICM decoding blocks and the frame demapper 4431 may be controlled based on upper-layer L1 signaling information, as clearly understood in the above description.

The BICM decoder 4434 signal-processes the OFDM cells constituting FEC blocks belonging to the selected PLP, extracts baseband packets, and delivers the baseband packets to the output processor 4435. The signal processing may include extracting LLR values for coding and decoding LDPC codes in OFDM cells, and decoding the LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal processing may be performed on the controlling information delivered from the controller 4433.

Meanwhile, according to an exemplary embodiment, the output processor 1235 may include an ALP packet processor (not illustrated) which extracts an ALP packet from a baseband packet.

Figure 19:
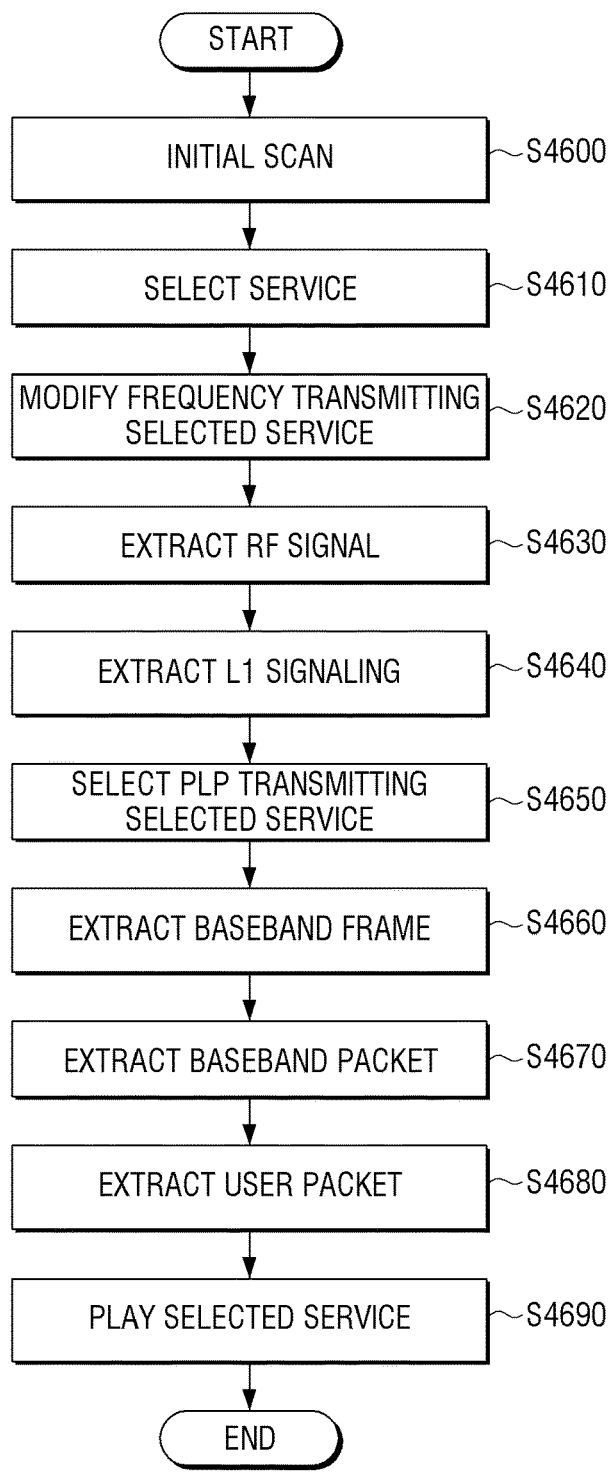
FIG. 19 is a flowchart provided to briefly explain an operation of a receiving apparatus from a time point when a user selects a service to a time point when the selected service is played.

FIG. 19 is a flowchart provided to briefly explain an operation of a receiving apparatus from a time point when a user selects a service to a time point when the selected service is played It is assumed that service information about all the services that can be selected at an initial scan process of S4600 is obtained prior to a service select process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S4610, the receiving apparatus modifies a frequency transmitting the selected service at S4620, and performs extracting RF signals at S4630. While performing S4620 modifying the frequency transmitting the selected service, the service information may be used.

When the RF signals are extracted, the receiver performs S4640 extracting L1 signaling from the extracted RF signals. The receiving apparatus selects a PLP transmitting the selected service by using the extracted L1 signaling at S4650, and extracts baseband packets from the selected PLP at S4660. At S4650 selecting the PLP transmitting the selected service, the service information may be used.

Further, S4660 extracting the baseband packets may include selecting OFDM cells belonging to the PLP by demapping a transmission frame, extracting LLR values for coding/decoding LDPC, and decoding LDPC codes by using the extracted LLR values.

The receiving apparatus performs S4670 extracting an ALP packet from the extracted baseband packet by using header information about the extracted baseband packet, and performs S4680 extracting a user packet from the extracted ALP packet by using header information about the extracted baseband packet. The extracted user packet is used in S1690 playing the selected service. At S4670 extracting the ALP packet and at S4680 extracting the user packet, L1 signaling information obtained at S4640 extracting the L1 signaling may be used. In this case, a process of extracting the user packet from the ALP packet (restoring null TS packet and inserting a TS sync byte) is the same as described above. According to the exemplary embodiments as described above, various types of data may be mapped to a transmittable physical layer and data processing efficiency may be improved.

Figure 20:
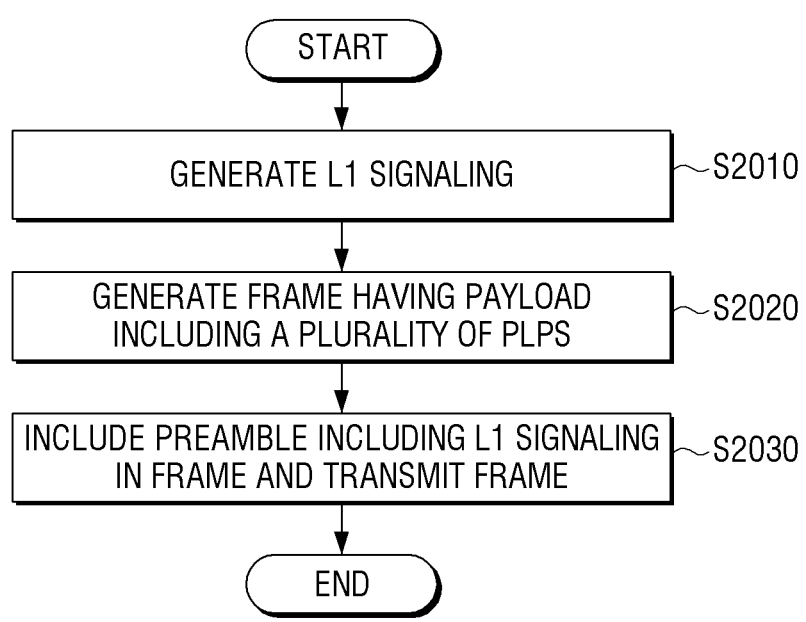
FIG. 20 is a flowchart provided to describe a method for controlling a transmitting apparatus according to an exemplary embodiment.

FIG. 20 is a flowchart provided to describe a method for controlling a transmitting apparatus according to an exemplary embodiment.

According to the method for controlling a transmitting apparatus of FIG. 20, L1 signaling is generated at S2010.

Subsequently, a frame having a payload including a plurality of PLPs is generated at S2020.

A preamble including the L1 signaling is included in a frame, and the frame is transmitted.

In this case, the L1 signaling includes the first information representing the alignment state of the starting positions of the PLPs included in the different layers among the plurality of PLPs and the second information representing the offset of the starting positions.

In addition, the L1 signaling may further include information on the arrangement order of the PLPs included in the different layers and information on the layers in which the PLPs are included.

The different layers may include one core layer and at least one enhanced layer, respectively. The generating the L1 signaling may include generating the first information and the second information in the time interleaving unit determined so as to correspond to the size of each of the plurality of PLPs included in the core layer.

The generating the L1 signaling may include generating the first information based on the starting positions of the PLPs having the same arrangement order in the respective different layers.

In addition, in response to the starting positions being difference, the generating the L1 signaling may include generating the second information based on a difference in the starting positions of the PLPs having the same arrangement order in the respective layers.

In addition, the second information may include information on a direction which is set with reference to the starting position of the PLP included in the core layer among the PLPs having the same arrangement order in the respective layers.

Meanwhile, according to the method for controlling a transmitting apparatus according to an exemplary embodiment, in response to the plurality of PLPs included in the payload being arranged in a transmission order and included in the payload, information on the size of each of the plurality of PLPs included in the payload and information on a PLP having the greatest corresponding degree with respect to the PLP in the core layer among the PLPs in the enhanced layer which correspond to one PLP in the core layer, may be further included.

Figure 21:
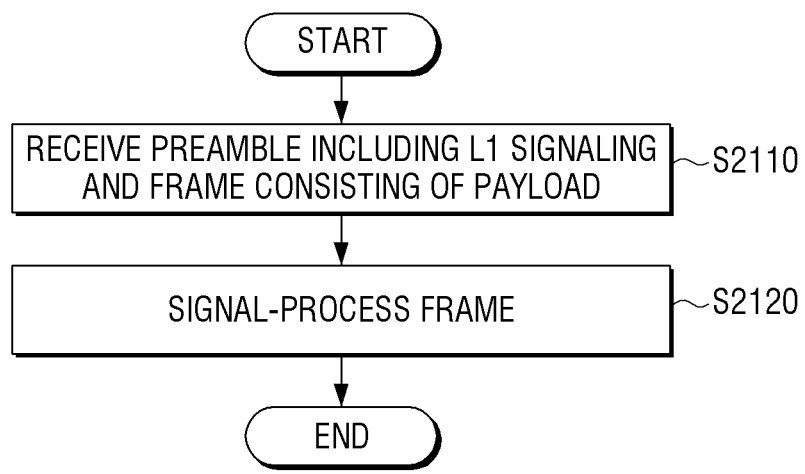
FIG. 21 is a flowchart provided to describe a method for controlling a receiving apparatus according to an exemplary embodiment.

FIG. 21 is a flowchart provided to describe a method for controlling a receiving apparatus according to an exemplary embodiment.

According to the method for controlling a receiving apparatus of FIG. 21, a preamble including L1 signaling and a frame including a payload are received at S2110.

Subsequently, a frame is signal-processed at S2120.

In this case, the payload includes a plurality of PLPs. The L1 signaling includes the first information representing the alignment state of the starting positions of the PLPs included in the different layers among the plurality of PLPs and the second information representing the offset of the starting positions.

The signal-processing the frame (S2120) includes signal-processing the plurality of PLPs included in the payload based on the first information and the second information.

In addition, the L1 signaling may further include information on the arrangement order of the PLPs included in the different layers and information on the layers in which the PLPs are included.

The different layers may include one core layer and at least one enhanced layer, respectively. The signal-processing the frame may include signal-processing the plurality of PLPs in a time deinterleaving unit determined so as to correspond to the size of each of a plurality of PLPs included in the core layer.

Meanwhile, a non-transitory computer readable medium including a program for sequentially executing the signal processing methods described above may be provided. The non-transitory computer readable medium refers to a medium which may store data permanently or semi-permanently rather than storing data for a short time, such as, register, cache, memory, and the like, and may be readable by an apparatus. To be specific, the above-described various applications and programs may be stored in and provided through the non-transitory computer readable recording medium, such as, Compact Disc (CD), Digital Versatile Disk (DVD), hard disk, Blu-ray disk, Universal Serial Bus (USB), memory card, Read-Only Memory (ROM), and the like.

At least one of the components, elements, modules or units represented by a block as illustrated in FIGS. 3A through 8 and 14A through 18 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

As above, a few exemplary embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to those skilled in the art.

What is claimed is:

1. A transmitting apparatus comprising at least one processor configured to implement:
an L1 signaling generator configured to generate L1 signaling;
a frame generator configured to generate a frame comprising the L1 signaling and a payload; and
a transmitter configured to transmit the frame;
wherein the payload comprises a first PLP and a second PLP included in different layers,
wherein the L1 signaling comprises first information and second information,
wherein the first information comprises a value indicating whether starting positions of the first PLP and the second PLP are time-aligned or not, and
wherein the second information comprises a value indicating an offset, the offset being a difference value between a starting position of the first PLP and a starting position of the second PLP.

2. The transmitting apparatus as claimed in claim 1, wherein the L1 signaling further comprises information on an arrangement order of the first PLP and the second PLP and information on the different layers in which the first PLP and the second PLP are included.

3. The transmitting apparatus as claimed in claim 2, wherein the different layers comprise one core layer and at least one enhanced layer,
wherein the L1 signaling generator generates the first information and the second information in a time interleaving unit determined so as to correspond to a size of each of PLPs included in the core layer.

4. The transmitting apparatus as claimed in claim 3, wherein the L1 signaling generator generates the first information based on starting positions of the first PLP and the second PLP having the same arrangement order in the respective different layers.

5. The transmitting apparatus as claimed in claim 4, wherein based on the starting positions being different, the L1 signaling generator generates the second information based on a difference in the starting positions of the first PLP and the second PLP.

6. The transmitting apparatus as claimed in claim 5, wherein the second information comprises information on a direction being set with reference to a starting position of a PLP included in the core layer among the first PLP and the second PLP.

7. The transmitting apparatus as claimed in claim 6, wherein based on the first PLP and the second PLP included in the payload being arranged in a transmission order and included in the payload, the L1 signaling further comprises information on a size of each of the first PLP and the second PLP included in the payload, information on a layer in which each of the first PLP and the second PLP is included, and information on a PLP having the greatest corresponding degree with respect to the PLP in the core layer from among PLPs in the enhanced layer, the PLPs in the enhanced layer corresponding to one PLP in the core layer.

8. A receiving apparatus comprising at least one processor configured to implement:
a receiver configured to receive a frame comprising L1 signaling and a payload; and
a processor configured to process the frame,
wherein the payload comprises a plurality of Physical Layer Pipes (PLPs),
wherein the payload comprises a first PLP and a second PLP included in different layers,
wherein the L1 signaling comprises first information and second information,
wherein the first information comprises a value indicating whether starting positions of the first PLP and the second PLP are time-aligned or not,
wherein the second information comprises a value indicating an offset, the offset being a difference value between a starting position of the first PLP and a starting position of the second PLP, and
wherein the processor processes the first PLP and the second PLP based on the first information and the second information.

9. The receiving apparatus as claimed in claim 8, wherein the L1 signaling further comprises information on an arrangement order of the first PLP and the second PLP and information on the different layers in which the first PLP and the second PLP are included.

10. The receiving apparatus as claimed in claim 9, wherein the different layers comprise one core layer and at least one enhanced layer,
wherein the processor processes the first PLP and the second PLP in a time deinterleaving unit which corresponds to a size of each PLP included in the core layer.

11. A method for controlling a transmitting apparatus, the method comprising:
generating L1 signaling;
generating a frame comprising the L1 signaling and a payload; and
transmitting the frame,
wherein the payload comprises a first PLP and a second PLP included in different layers,
wherein the L1 signaling comprises first information and second information,
wherein the first information comprises a value indicating whether starting positions of the first PLP and the second PLP are time-aligned or not, and
wherein the second information comprises a value indicating an offset the offset being a difference value between a starting position of the first PLP and a starting position of the second PLP.

12. The method as claimed in claim 11, wherein the L1 signaling further comprises information on an arrangement order of the first PLP and the second PLP and information on the different layers in which the first PLP and the second PLP are included.

13. The method as claimed in claim 12, wherein the different layers comprises one core layer and at least one enhanced layer,
wherein the generating the L1 signaling comprises generating the first information and the second information in a time interleaving unit determined so as to correspond to a size of each of PLPs included in the core layer.

14. The method as claimed in claim 13, wherein the generating the L1 signaling comprises generating the first information based on starting positions of the first PLP and the second PLP having the same arrangement order in the respective different layers.

15. The method as claimed in claim 14, wherein the generating the L1 signaling comprises generating the second information based on a difference in the starting positions of the first PLP and the second PLP.

16. The method as claimed in claim 15, wherein the second information comprises information on a direction being set with reference to a starting position of a PLP included in the core layer among the first PLP and the second PLP.

17. The method as claimed in claim 16, wherein in based on the first PLP and the second PLP included in the payload being arranged in a transmission order and included in the payload, the L1 signaling further comprises information on a size of each of the first PLP and the second PLP included in the payload, information on a layer in which each of the first PLP and the second PLP is included, and information on a PLP having the greatest corresponding degree with respect to the PLP in the core layer from among PLPs in the enhanced layer, the PLPs in the enhanced layer corresponding to one PLP in the core layer.

* * * * *